US 6,729,960 B1

(12) United States Patent
Matsuno

(10) Patent No.: US 6,729,960 B1
(45) Date of Patent: May 4, 2004

(54) COMPUTER READABLE PROGRAM PRODUCT, PROGRAM, GAME CONTROL METHOD, AND GAME PROCESSOR FOR CONTROLLING PROGRESS OF GAME

(75) Inventor: Yasumi Matsuno, Tokyo (JP)

(73) Assignee: Kabushiki Kaisha Square Enix, Tokyo (JP)

( * ) Notice: Subject to any disclaimer, the term of this patent is extended or adjusted under 35 U.S.C. 154(b) by 463 days.

(21) Appl. No.: 09/605,851

(22) Filed: Jun. 29, 2000

(30) Foreign Application Priority Data

Jul. 1, 1999 (JP) .......................................... 11-187284

(51) Int. Cl.[7] .............................................. A63F 13/00
(52) U.S. Cl. ................................ 463/30; 463/8; 463/31
(58) Field of Search ................................... 463/1–9, 30

(56) References Cited

U.S. PATENT DOCUMENTS

| | | | |
|---|---|---|---|
| 6,237,814 B1 * | 5/2001 | Blyler et al. ............ | 222/189.09 |
| 6,273,814 B1 * | 8/2001 | Komoto ..................... | 463/7 |
| 6,340,330 B1 * | 1/2002 | Oishi et al. ................ | 463/8 |
| 6,585,599 B1 * | 7/2003 | Horigami et al. ........... | 463/43 |

FOREIGN PATENT DOCUMENTS

JP         2794230         4/1994

OTHER PUBLICATIONS

English Language Abstract of JP 2794230.
"Final Fantasy VII Kaitaishinsho" by Ascii K.K., pp. 45 and 94–95, Mar. 24, 1997, with English Translation.

* cited by examiner

Primary Examiner—John M. Hotaling, II
(74) Attorney, Agent, or Firm—Greenblum & Bernstein, P.L.C.

(57) ABSTRACT

A computer readable program product storing a program for controlling progress of a game, the program product storing a program for making a computer set as invalid an operational input for instructing a next action of a character when an action of the character has already been instructed, start a count based on a predetermined timing from when an operational input has been set as invalid to when said action of the character has ended, set as valid an operational input for instructing a next action of a character when said counted time reaches a predetermined time set linked in advance with the action, and executing processing relating to action of the character instructed in accordance with an operational input after the operational input has been set as valid and such a program, game control method, and game processor used with the same.

20 Claims, 18 Drawing Sheets

| TYPE OF ACTION | WAITING TIME (COUNT VALUE) | ACTION ENABLE FLAG |
|---|---|---|
| NORMAL ATTACK (WEAPON ATTACK) | 10 | 1 |
| NORMAL DEFENSE (PROTECTIVE GEAR DEFENSE) | 8 | 1 |
| FIREBALL (MAGIC ATTACK) | 15 | 1 |
| SOLID SHOCK (MAGIC ATTACK) | 17 | 1 |
| HEAL (MAGIC DEFENSE) | 5 | 1 |
| CHARGE (MAGIC DEFENSE) | 6 | 1 |
| DOUBLE FANG (KILLER SKILL ATTACK) | 20 | 1 |
| ESCAPE (FIGHT EVASION) | 7 | 1 |
| HERB (ITEM USE) | 4 | 1 |
| EYE MEDICINE (ITEM USE) | 4 | 0 |
| WALK (MOVE) | 0 | 1 |
| RUN (MOVE) | 0 | 1 |
| JUMP (MOVE) | 0 | 1 |
| ⋮ | ⋮ | ⋮ |

Fig.4

| COUNT TIME (COUNT VALUE) | 7 | |
|---|---|---|
| COUNT SPEED | 0.0 (STOP) | 0 |
| | 0.5 | 0 |
| | 1.0 (NORMAL) | 1 |
| | 1.5 | 0 |
| | 2.0 | 0 |

Fig.5

| COUNT SPEED | STATUS | CONTINUOUS TIME (COUNT VALUE) | STATUS FLAG |
|---|---|---|---|
| 0.0 | WHEN STOP (MAGIC) IS CAST BY OPPONENT | 7 | 0 |
| 0.0 | WHEN BECOMING UNABLE TO FIGHT | UNTIL RELEASED | 0 |
| 0.5 | WHEN SLOW (MAGIC) IS CAST BY OPPONENT | 10 | 1 |
| 0.5 | WHEN STATUS BECOMES ABNORMAL DUE TO PARALYSIS, POISONING, ETC. | UNTIL RELEASED | 0 |
| 1.0 | NORMAL CASE | — | 0 |
| 1.5 | WHEN CASTING HASTE (MAGIC) ON ONESELF | 20 | 0 |
| 2.0 | WHEN CASTING SPEEDUP (MAGIC) ON ONESELF | 12 | 0 |
| | CONTINUOUS TIME | 4 | |

COMPUTER READABLE PROGRAM PRODUCT, PROGRAM, GAME CONTROL METHOD, AND GAME PROCESSOR FOR CONTROLLING PROGRESS OF GAME

The present disclosure relates to subject matter contained in Japanese Patent Application No. 11-187284, filed on Jul. 1, 1999, the disclosure of which is expressly incorporated herein by reference in its entirety.

BACKGROUND OF THE INVENTION

1. Field of the Invention

The present invention relates to a program product, program, game control method, and game processor for controlling progress of a video game.

2. Description of the Related Art

There are many types of games provided by video games. Among these, there are video games displaying a player character operated by a player on a display screen and making for example the player character and an enemy character controlled by the computer fight on the display screen. Various command inputs for the player character are entered by operational signals input from a controller or other input device by the player.

As examples of the command input for a player character, there are instructions regarding the movement of the player character and instructions of actions to be executed by the player character from among a plurality of actions prepared in advance such as attack, defense, use of items, etc.

As an example of such a video game, Japanese Patent No. 2794230 discloses a game which allows input of a command for selecting the next fight action of a character after a waiting time set for each character in advance elapses after a timing from the start of the fight or the end of a fight action of the character. That is, the input of a command for selection of the action to be executed by a character is allowed when a waiting time distinctive to the character has elapsed after the previous action of the character ends.

Summarizing the problems to be solved by the invention, in such a game, to give more diversity by this mode and enhance the interestingness or play effect of the game, the timing for allowing input of a command designating the next action of the character is an important element. That is, it is important to devise various methods of setting the waiting time from the instruction of a previous action to allowance of the input of a command for instructing the next action. Further, it is important to devise various methods for counting the waiting time based on various factors.

SUMMARY OF THE INVENTION

An object of the present invention is to make the waiting time an amount of time corresponding to the content of the previous action of the character so as to provide a more interesting game.

Another object of the present invention is to change the count speed of the waiting time in accordance with the state of the character so as to provide a more interesting game.

According to a first aspect of the present invention, there is provided a computer readable program product storing a program for controlling progress of a game, the program product storing a program for making a computer set as invalid an operational input for instructing a next action of a character when an action of the character has already been instructed, start a count based on a predetermined timing from when an operational input has been set as invalid to when the action of the character has ended, set as valid an operational input for instructing a next action of a character when the counted time reaches a predetermined time set linked in advance with the action, and execute processing relating to action of the character instructed in accordance with an operational input after the operational input has been set as valid.

According to a second aspect of the present invention, there is provided a computer readable program product for controlling progress of a game, the program product storing a program for making a computer display a remaining time until a period ends in a period where an operational input for instructing a next action of a character is set as invalid after the start of the count and display guidance for prompting a player to enter an operational input when the period has ended and an operational input for instructing a next action of the character is set as valid.

According to a third aspect of the present invention, there is provided a program for controlling progress of a game, the program making the computer set as invalid an operational input for instructing a next action of a character when an action of the character has already been instructed, start a count based on a predetermined timing from when an operational input has been set as invalid to when the action of the character has ended, set as valid an operational input for instructing a next action of a character when the counted time reaches a predetermined time set linked in advance with the action, and execute processing relating to action of the character instructed in accordance with an operational input after the operational input has been set as valid.

According to a fourth aspect of the present invention, there is provided a program for controlling progress of a game, the program making a computer display a remaining time until a period ends in a period where an operational input for instructing a next action of a character is set as invalid after the start of the count and display guidance for prompting a player to enter an operational input when the period has ended and an operational input for instructing a next action of the character is set as valid.

According to a fifth aspect of the present invention, there is provided a game control method for controllling program of a game, the game control method including setting as invalid an operational input for instructing a next action of a character when an action of the character has already been instructed, starting a count based on a predetermined timing from when an operational input has been set as invalid to when the action of the character has ended, setting as valid an operational input for instructing a next action of a character when the counted time reaches a predetermined time set linked in advance with the action, and executing processing relating to action of the character instructed in accordance with an operational input after the operational input has been set as valid.

According to a sixth aspect of the present invention, there is provided a game control method for controlling progress of a game, the game control method including displaying a remaining time until a period ends in a period where an operational input for instructing a next action of a character is set as invalid after the start of the count and displaying guidance for prompting a player to enter an operational input when the period has ended and an operational input for instructing a next action of the character is set as valid.

According to a seventh aspect of the present invention, there is provided a game processor provided with a computer readable program product storing a program for controlling progress of a game and a computer for reading and executing at least part of the program from the program product, the computer reading at least part of the program from the program product and thereby setting as invalid an operational input for instructing a next action of a character when an action of the character has already been instructed, starting a count based on a predetermined timing from when an operational input has been set as invalid to when the action of the character has ended, setting as valid an operational input for instructing a next action of a character when the counted time reaches a predetermined time set linked in advance with the action, and executing processing relating to action of the character instructed in accordance with an operational input after the operational input has been set as valid.

According to an eighth aspect of the present invention, there is provided a game processor provided with a computer readable program product storing a program for controlling progress of a game, a computer for reading and executing at least part of the-program from the program product, and a display for displaying a game realized by the program, the computer reading at least part of the program from the program product to display a remaining time until a period ends in a period where an operational input for instructing a next action of a character is set as invalid after the start of the count and display guidance for prompting a player to enter an operational input when the period has ended and an operational input for instructing a next action of the character is set as valid.

BRIEF DESCRIPTION OF THE DRAWINGS

These and other objects and features of the present invention will become clearer from the following description of the preferred embodiments given with reference to the attached drawings, in which:

FIG. 4 is a view of the data structure of a count control table stored in the RAM shown in FIG. 2;

FIG. 5 is a view of the data structure of a count speed change control table stored in the RAM shown in FIG. 2;

DESCRIPTION OF TEE PREFERRED EMBODIMENTS

Preferred embodiments of the present invention will be explained below with reference to the drawings. Note that the following explanation is given of the case of application to a home game system, but the present invention is not limited to a home game system.

First Embodiment

Figure 1:
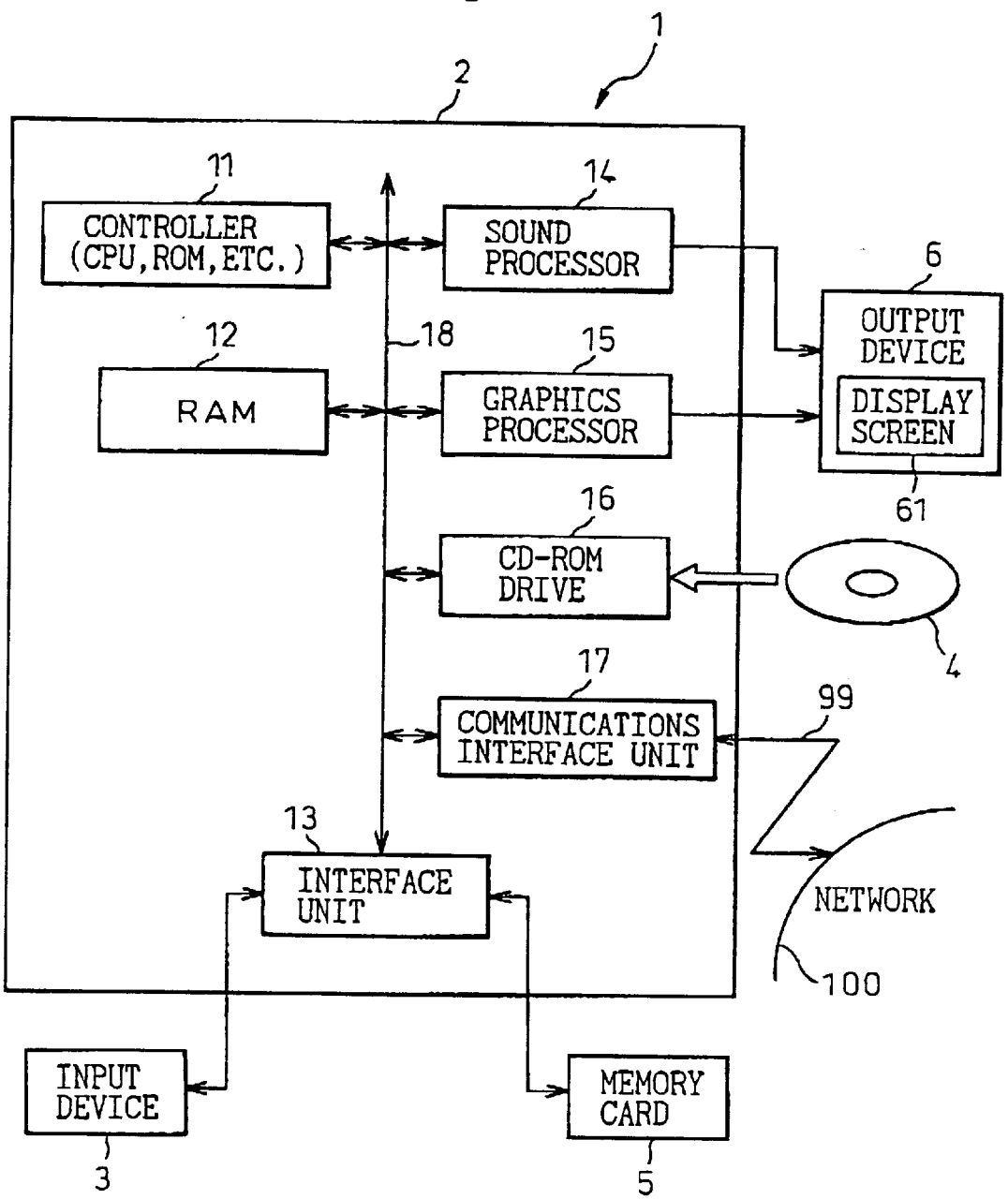
FIG. 1 is a block diagram of the overall configuration of a game system according to the present invention.

FIG. 1 is a block diagram of the overall configuration of a game system according to an embodiment of the present invention.

The game system 1, roughly speaking, is comprised of a game console 2 having the main functions of the game system 1, an input device (controller) 3 for inputting operational instructions to the game console 2, a memory card 5 for storing saved data such as data on the progress of the game and data on the game environment settings, and an output device 6 for displaying an image or outputting sound in accordance with the content of the game based on a video signal and audio signal from the game console 2.

The game console 2 is for example provided with a controller 11, random access memory (RAM) 12, interface unit 13, sound processor 14, graphic processor 15, CD-ROM drive 16, communications interface 17, and a bus 18 connecting these components with each other. Further, the CD-ROM drive 16 is configured to be able to be loaded with a CD-ROM 40 or other program product 4 storing a program, image data, sound data, etc. for realizing the processing relating to the later-mentioned game.

The controller 11 is comprised of a central processing unit (CPU), read only memory (ROM), etc. The CPU controls the different parts in accordance with a program stored in the RAM 12 (in some cases, a ROM). Further, the controller 11 is provided with an oscillator or time counter (both not shown). The controller 11 generates a clock signal based on the timing signal output from the oscillator every predetermined period. By counting the clock signal by the time counter, the time can be counted.

The interface unit 13 is configured to be able to be detachably connected to the input device 3 and memory card 5. The interface unit 13 controls the transfer of data between the parts connected to the bus 18 (main controller 11) and the input device 3 or memory card 5.

The sound processor 14 functions to generate background music, sound effects, etc. of the game. The sound processor 14 generates an audio signal in accordance with instructions from the controller 11 based on data stored in the RAM 12. The generated audio signal is output to the output device 6.

The graphic processor 15 is provided with a frame buffer (not shown). The graphic processor 15 draws an image corresponding to the instructions from the controller 11 in the frame buffer. Further, the graphic processor 15 generates a video signal for displaying image data drawn in the frame buffer. The generated video signal is output to the output device 6.

The CD-ROM drive 16 is a device for reading data stored on the program product 4, here, the CD-ROM. The game system 1 makes the controller 11 control the game in accordance with the game program stored in the CD-ROM. Control of the game explained later is realized by this.

The communications interface 17 controls communication for exchanging data among apparatuses on a network 100. The communications interface 17 is connected to the network 100 through a communications line 99 in accordance with need.

Figure 2:
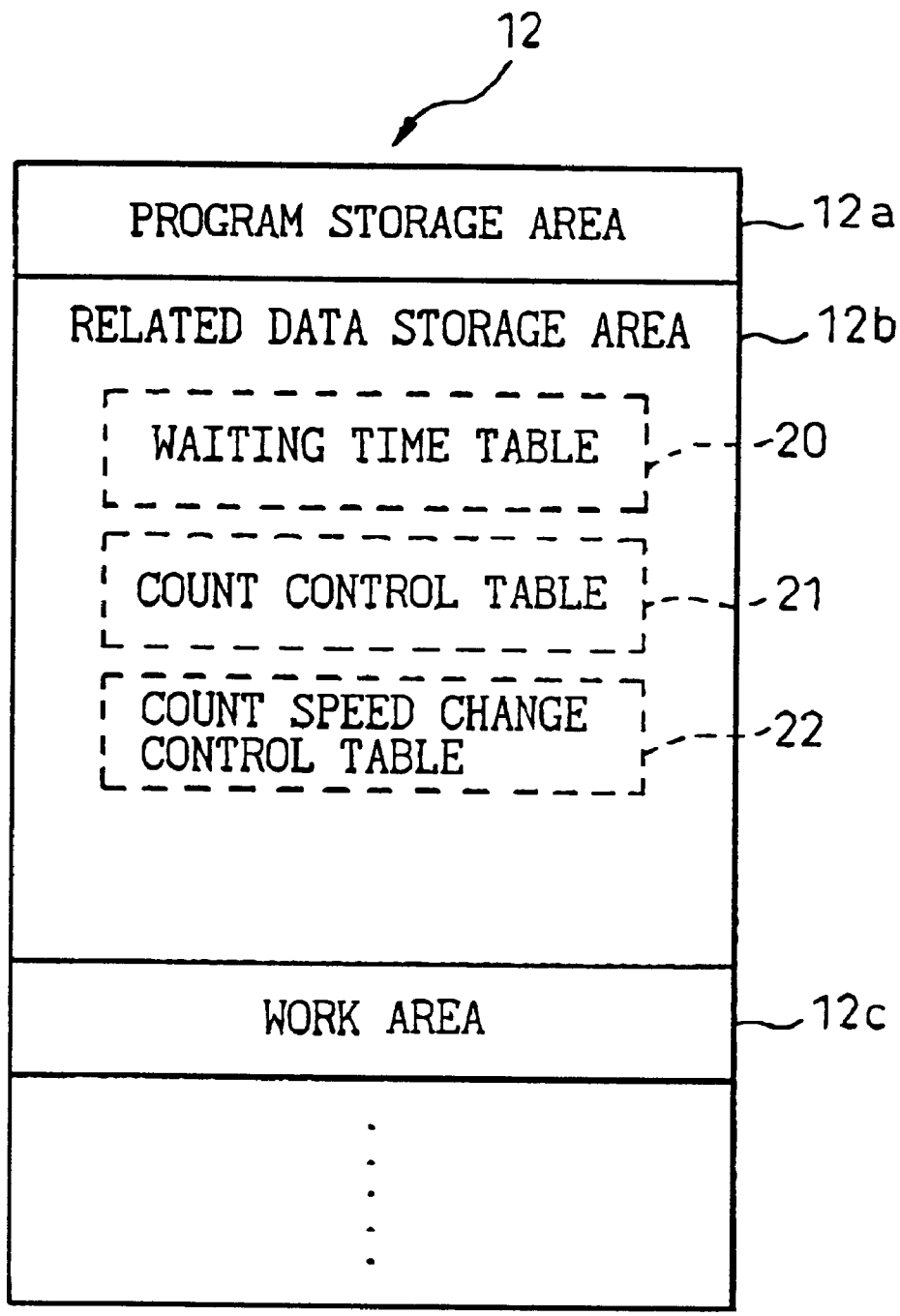
FIG. 2 is a view of a memory configuration of a RAM in a first embodiment of the present invention.

FIG. 2 is a view of the memory configuration of the RAM 12 shown in FIG. 1.

The RAM 12 has for example a program storage area 12a, a related data storage area 12b, and a work area 12c. The program storage area 12a stores a program to be executed by the controller 11. The related data storage area 12b stores data required for execution of the various processing in a game such as the later mentioned waiting time table 20, count control table 21, and count speed change control table 22.

The present embodiment starts the count based on a predetermined timing in the period from when an action has been instructed for the player character to when the player character ends that action. Until the counted time reaches a predetermined time (hereinafter called the set waiting time), any operational input made by the player instructing the next action for the player character is invalidated. When the counted time reaches the set waiting time, an operational input for instructing a next action for the player character becomes valid. Here, the set waiting time is set linked with each action which the player character can execute. Below, operational input for instructing an action is called an "action instruction input".

Therefore, the game system 1 is provided with a counting means for counting the time and a setting means for setting as valid or invalid the input of an instruction for the next action to the player character. The counting means starts the count based on a predetermined timing between when an action is instructed for the player character to when the player character completes that action. The setting means sets as invalid an input instructing a next action during the period before the time being counted by the counting means reaches the set waiting time and sets as valid an input instructing a next action when the count time reaches the set waiting time.

Further, the present embodiment changes the speed of counting in the counting means in accordance with a changed state when the state of the player character is changed to one of a predefined plurality of states. A change occurring in the state of the player character includes magic being cast on the player character, an abnormal status, etc. How to change the count speed is determined in advance linked with the state of the character. Therefore, the game system 1 is provided with a status changing means for changing the state of the player character in accordance with progress in the game and account speed changing means for changing the count speed in the counting means.

Further, the present embodiment is provided with a means for displaying the remaining time during a period in which any input of instruction for next action of the player character becomes invalid until that period ends, that is, the waiting time until an input of instruction for next action of the player character becomes valid. Further, it is provided with a means for displaying guidance for prompting a player to enter operational input for instructing the next action of a player character during the period when the input of instruction for next action of the player character becomes valid.

Specifically, the counting means is realized by a time counter built into the controller 11. Further, the controller 11 has the various functions of the setting means, state changing means, and count speed changing means. The graphic processor 15 has the functions of a means for displaying the remaining time until the period of invalidity of input of instructions for action ends and a means for displaying guidance.

Figure 3:
FIG. 3 is a view of the data structure of a waiting time table stored in the RAM shown in FIG. 2.

FIG. 3 is a view of the data structure of the waiting time table 20.

The waiting time table 20 is a table storing the correspondence between all actions which the player character can execute and the period until the input of an instruction for next action becomes valid when a certain action is being executed (hereinafter referred to as the waiting time). The waiting time table 20 is comprised of for example a "WAITING TIME" column 201 and an "ACTION ENABLE FLAG" column 202.

The "WAITING TIME" column 201 stores the settings of the corresponding waiting times, that is, the values of the set waiting times. Normally, the value of the set waiting time corresponding to a certain action is set proportionally to the size of the effect on the progress of the game when that action is executed. For example, as shown in FIG. 3, the damage which a killer skill attack called a "DOUBLE FANG" gives to an enemy character is larger than the attack action (normal) attack by a weapon which the player character is equipped with and a defense action (normal defense) by protective gear it is equipped with. Therefore, the value of the set waiting time of the killer skill attack becomes larger than the value of a normal attack or normal defense. That is, an action with a large effect on the progress of the game is set with a longer set waiting time. For actions where no waiting time occurs even if the actions are executed, for example, actions such as "WALK" or "RUN", the value of the set waiting time is set to "0 (zero)". Here, the value of the set waiting time is the count value of the time counter. It is not particularly limited, but for example is a value incremented by one every one-quarter of a second (15 frames).

The "ACTION ENABLE FLAG" column 202 stores the value "1" or "0". The player character can execute an action with a value in the "ACTION ENABLE FLAG" column 202 of "1". An action with a value in the "ACTION ENABLE FLAG" column 202 of "0" cannot be executed. An action which the player character later becomes able to execute along with the progress of the game has an initial value of "0" in the corresponding "ACTION ENABLE FLAG" column 202. Factors later enabling execution include growth of the character such as the level of ability of the player character improving and clearing of the stage. Further, when making the player character use an item of equipment, if it can be used and the player character has at least one item, the value of the "ACTION ENABLE FLAG" column 202 is set to "1".

FIG. 4 is a view of an example of the data structure of the count control table 21.

The count control table 21 is a table storing data for controlling the counting of the waiting time. The count control table 21 for example is comprised of a "WAITING TIME" column 211 and a "COUNT SPEED" column 212

The "WAITING TIME" column 211 stores the data on the elapsed time from a predetermined timing between when an action with a set waiting time set to a value other than zero is instructed for the player character to when the player character ends the action, for example, the timing when the execution of the action ends. Specifically, the time data is a count value counted by a counter. During the counting, the value of the "COUNT TIME" column 211 is continuously updated. Further, when the set waiting time elapses and the input of an instruction for the next action for the player character becomes valid, the value of the "COUNT TIME" column 211 is reset to zero. Note that the timing for start of the counting of the waiting time may be the above-mentioned timing of the end of an action, the timing of instruction of an action, the timing of start of an action, or any timing between the instruction of an action to the end of an action. If the timing of start of counting the waiting time is set to the timing of the end of an action instructed, when the present invention is applied to each character on a fight scene involving a number of characters, the player can more easily recognize the waiting time set for each character.

The "COUNT SPEED" column 212 stores flags for setting the speed when counting. In the present embodiment, the count speed is set in five stages of "0.0", "0.5", "1.0", "1.5", and "2.0". Further, one of the count speeds is used in accordance with the state of the player character. The value of the flag of the count speed used becomes "1", while the values of the flags of the other count speeds becomes "0".

The "1.0" speed is the normal speed. While not particularly limited, it is a speed incrementing the count by one every one-quarter of a second (15 frames). The speeds of "0.01", "0.5", "1.0", "1.5", and "2.0" are speeds when using these values as proportions of a speed of "1.0". The speed of "0.0" is the stopped state.

Giving a specific example, for example, when the magic "STOP" is cast on the player character, the counting speed is set to "0.0". Therefore, during the period when the effect of the magic "STOP" continues, the count value of the counter is not incremented, so the waiting time is not reduced. Further, when the player character casts the magic "SPEED UP" on itself, the count speed is set to "2.0". Therefore, during the period when the effect of the magic continues, the counter increments the count by a speed two times the normal speed, so the waiting time is counted by twice the normal speed.

FIG. 5 is a view of the data structure of the count speed change control table 22.

The count speed change control table 22 is a table for storing the data for controlling the change of the count speed. The count speed change control table 22 is for example comprised of the "STATUS" column 221, "CONTINUOUS TIME" column 222, "STATUS FLAG" column 223, and "CONTINUOUS TIME" column 224.

The "STATUS" column 221 stores the content of the state corresponding to each count speed from "0.0" to "2.0". When a change occurs in the state of the player character, the "STATUS" column 221 of the count speed change control table 22 is referred to. Further, it is judged if there is an entry matching the change in state of the player character. If there is a matching one, the count speed is changed. In the present embodiment, when the player character is subjected to a magic attack from an enemy character, when the player character becomes abnormal in status, etc., a change occurs in the state of the player character.

The "CONTINUOUS TIME" column 222 stores the settings of times for continuation of the state of change of the count speed. Below, such a setting will be called a set continuous time. Each value of the set continuous time is a count value of the time counter. While not particularly limited, it is for example a value incremented by one every one-quarter of a second (15 seconds). Further, when the player character is in a state unable to fight or an abnrmal status state, the set continuous time is set to "UNTIL RELEASED". "UNTIL RELEASED" means that the count time is maintained in the changed state until the fight disabled state or status abnormality is released due to use of an item or magic. If the state of a character changes due to certain magic, the counting speed is changed corresponding to this. Simultaneously with this, the counting of the time is started. Further, when the counted time reaches the set continuous time, the counting speed returns to the normal speed "1.0".

The "STATUS FLAG" column 22 stores the value of "1" or "0". From the value of the status flag, the current state of the player character can be understood. That is, the current state of the player character is the state where the value of the status flag is "1". When the state of the player character changes, the "STATUS" column 221 is referred to. Further, if matching with the change in state of the player character, the value of the corresponding status flag is set to "1". The values of the other status flags are set to "0". When a plurality of status flags can be set to "1", one of the status flags among the counting speeds which can be set to "1" is set to "1" based on a predetermined priority. One count speed is set in accordance with the same.

The "CONTINUOUS TIME" column 224 stores data of the time elapsed from the occurrence of a state where the counting speed is changed in the player character. Specifically, the time data is the count value counted by for example a counter. While not particularly limited, for example, it is a value incremented by one every one-quarter of a second (15 seconds). The counting of the continuous time is performed at a predetermined speed of 1.0 provided in a fixed manner regardless of the change of the state of the player character. Note that instead of using the count speed change control table 22 to specify the count speed corresponding to the change in status of the player character, a program instruction to the effect of changing to one count speed of "0.0" to "2.0" in accordance with the change of state of the player character is provided in the game program.

Next, the operation of the game system 1 according to the present embodiment will be explained in detail.

The controller 11 reads the program and data required for execution of a game from the program product 4, that is, CD-RM, through the CD-RM drive 16 and transfers them to the RAM 12 based on the operating system stored in the built-in ROM. The controller 11 executes the program transferred to the RAM 12 to realize various processings described below. Note that among the control operations of the game system 1, there are ones which other circuits actually perform in cooperation with the controller 11. For convenience in explanation, below, the explanation will be given assuming direct control by the controller 11.

Further, the program and data required for execution of the game are actually successively read from the program product 4, that is, the CD-ROM, and transferred to the RAM 12 in accordance with the state of progress of the processing in accordance with instructions from the controller 11. In the following explanation, however, to facilitate the understanding of the invention, a detailed explanation of the reading of data from the CD-ROM and the transfer to the RAM 12 will be omitted.

Figure 6:
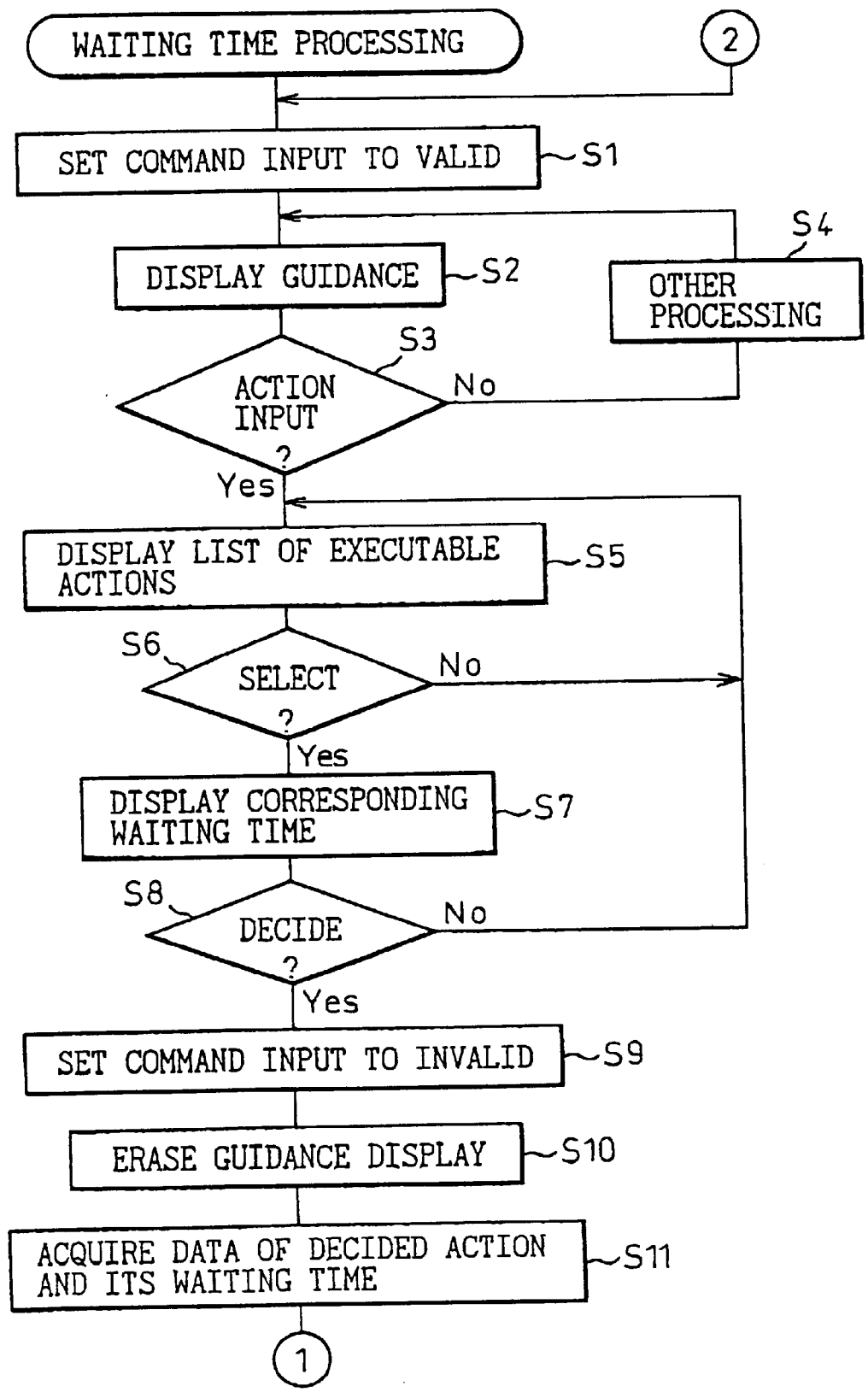
FIG. 6 is a flow chart of the waiting time processing of the first embodiment of the present invention.
Figure 7:
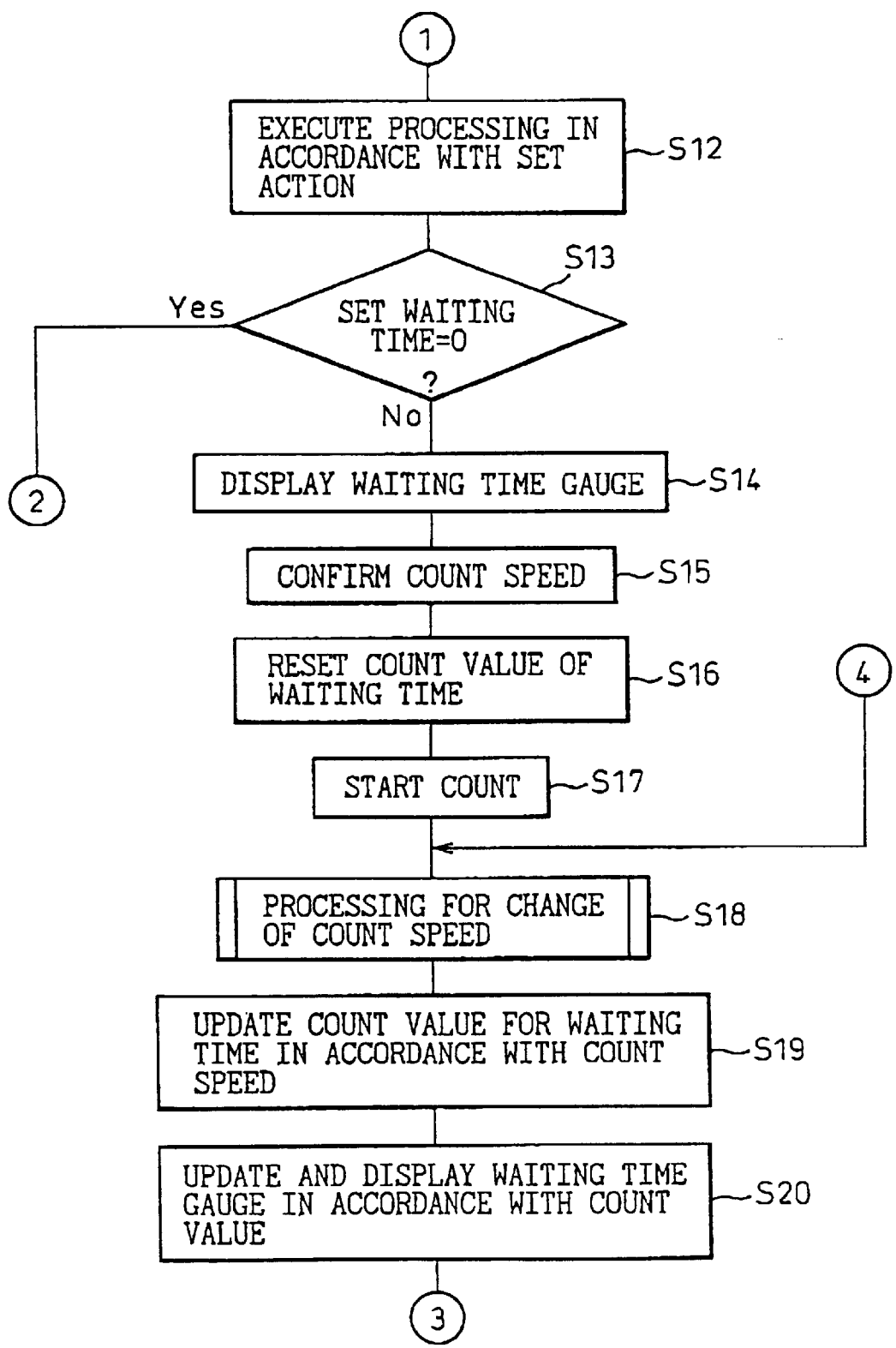
FIG. 7 is a flow chart continued from FIG. 6.
Figure 8:
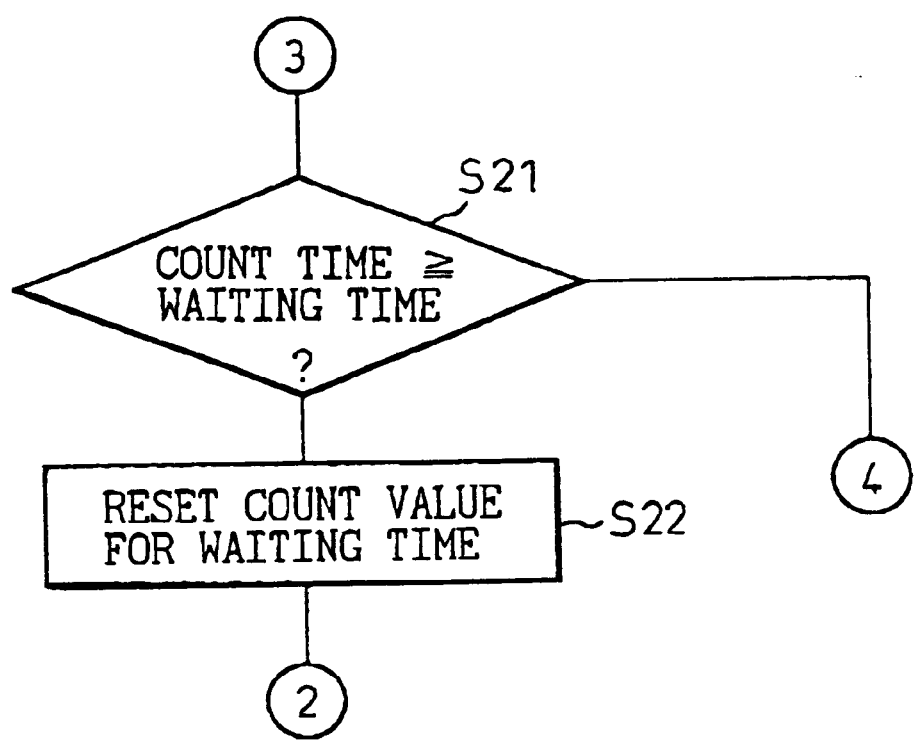
FIG. 8 is a flow chart continued from FIG. 7.

FIG. 6 to FIG. 8 are flow charts of the waiting time processing.

An explanation will be made first of the waiting time processing while referring to the example of the display screen shown in these figures and FIG. 10 to FIG. 13.

The waiting time processing executed when the player operates the controller or other input device 3 and sets the action to be executed by the player character in accordance with the operational input. When the waiting time processing is executed, first, a command input for setting a predetermined action for the player character is set as valid (step S1). That is, the controller 11 enters a state for receiving the input of the command for setting the action from the player.

Figure 10:
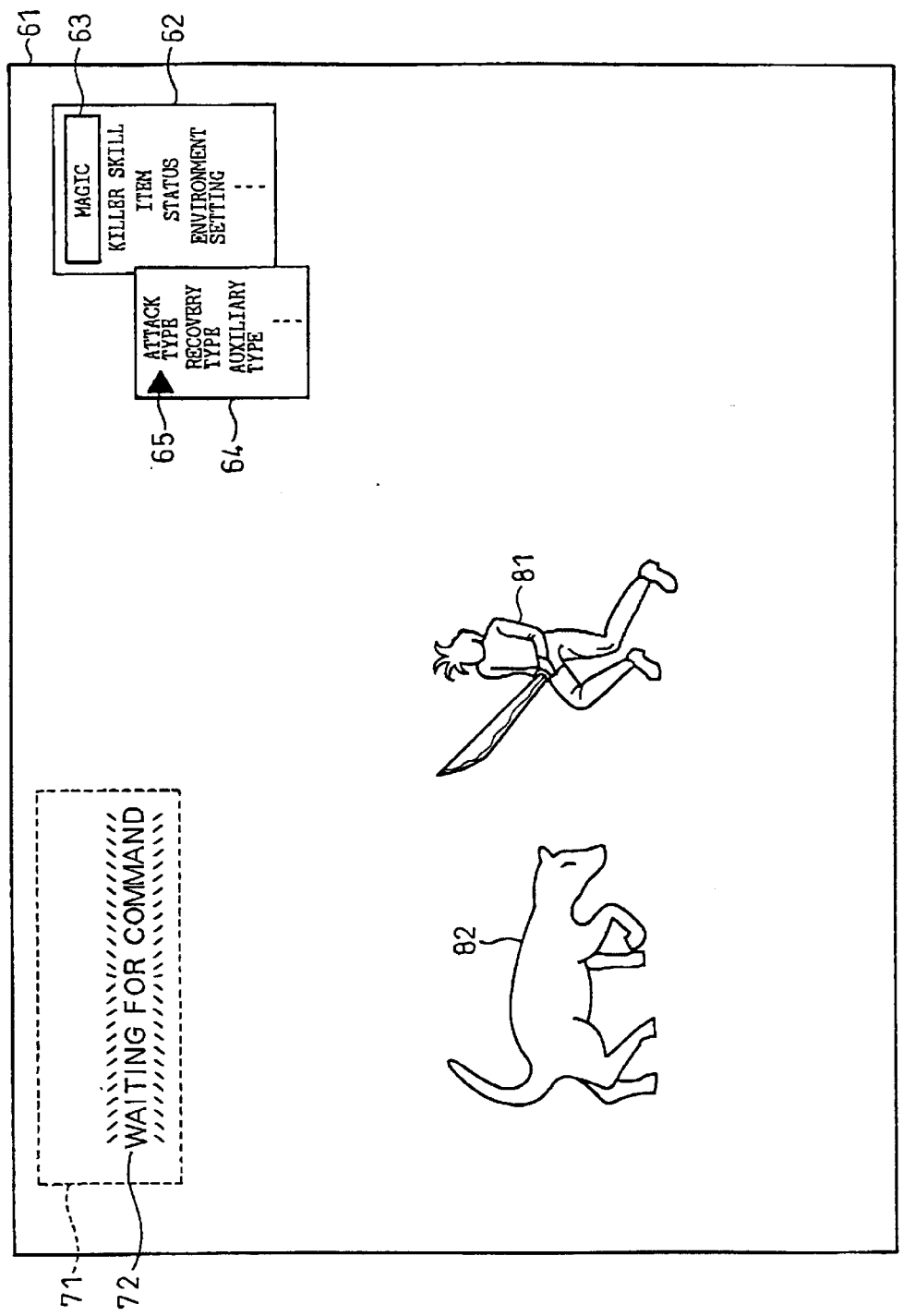
FIG. 10 is a view of an example of the screen display shown in waiting time processing of the first embodiment of the present invention.

When the input of a command is set as valid, for example, in the example of the screen display shown in FIG. 10, the display screen 61 of the display provided in the output device 6 displays a guidance display 72 for prompting the player to input a command (step S2). This guidance display 72 is displayed in the waiting time information display area 71 secured in the display screen 61. In the present embodiment, as the guidance display 72, for example, the message "WAITING FOR COMMAND" is displayed flashing. Note that in FIG. 10, the message "WAITING FOR COMMAND" is surrounded by dots to show that the display of the message is flashing. By displaying the guidance display 72 for prompting the player to input a command in this way, the player can easily learn that a command can be input.

Further, the display screen 61 displays a main window 62. The main window 62 displays a list of the items relating to setting actions such as "MAGIC" or "KILLER SKILL" or items such as environmental settings. The player operates the direction keys etc. of the input device 3 to move the icon to any item and then performs a specific key operation in the selected state to determine the selected item. FIG. 10 shows the state of selection and determination of the item of "MAGIC" in the main window 62. According to the illustrated example, the selected and determined item is either surrounded by a selection and determination display frame 63 or displayed with a background color of the letters different from the others.

When any item is selected by the operational input of the player, it is judged if the determined item is an item relating to setting an action (step S3). When the result is that an item other than an item relating to an action (environmental setting etc.) is determined, the corresponding processing is executed (step S4) and the display of guidance of step S2 is returned to.

On the other hand, when it is determined at step S3 that an item related to setting an action by the player is determined, for example, a sub window 64 is displayed on the display screen 61. The sub window 64 displays a list of classification items such as "ATTACK TYPE", "RECOVERY TYPE", and "AUXILIARY TYPE". The player can operate the directional keys of the input device 3 etc. to move the icon 65 to any item and then performs a specific key operation in the selected state to decide on the selected item.

When any classification item is determined by the operational input of the player, the determined classification item is either surrounded by a selection and determination display frame 66 or displayed by a background color of letters different from others. In the example of the screen display shown in FIG. 11, the state is shown where the classification item "ATTACK TYPE" in the sub window 64 is decided on. When the classification item of the setting of an action is determined, the sub window 67 is displayed on the display screen 61.

The sub window 67 displays a list of the items of actions belonging to the classification item selected by the sub window 64 which the player character can execute (step 35). The player operates the direction keys etc. of the input device 3 to move the icon 68 to any item and performs a specific key operation in the selected state to decide on the selected item. When acquiring an action which the player character can execute, the waiting time table 20 is referred to, An action which the player character can execute is one with a value "1" stored in the "ACTION ENABLED FLAG" column 202 of the waiting time table 20.

Figure 11:
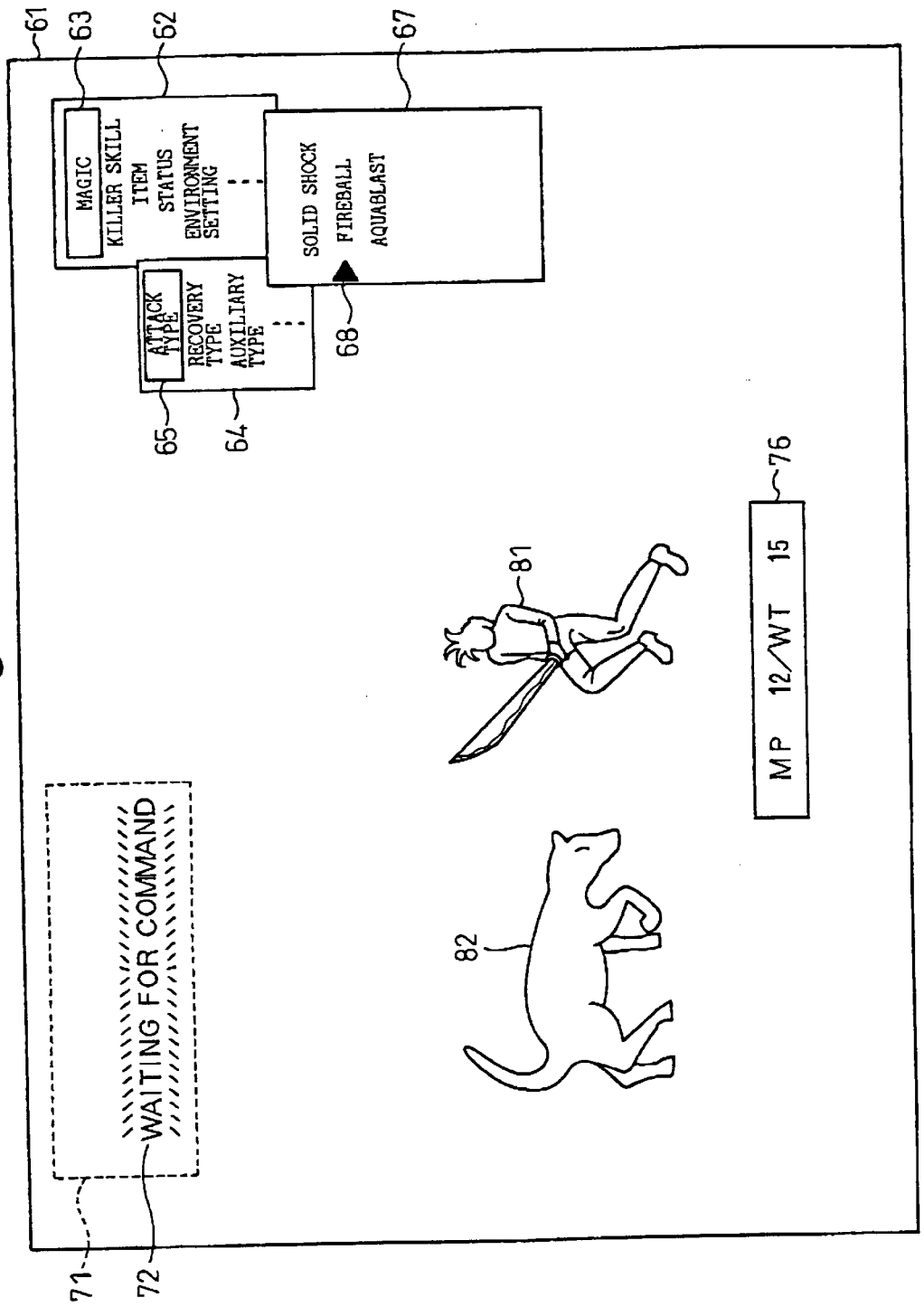
FIG. 11 is a view of an example of the screen display shown in waiting time processing of the first embodiment of the present invention.
Figure 12:
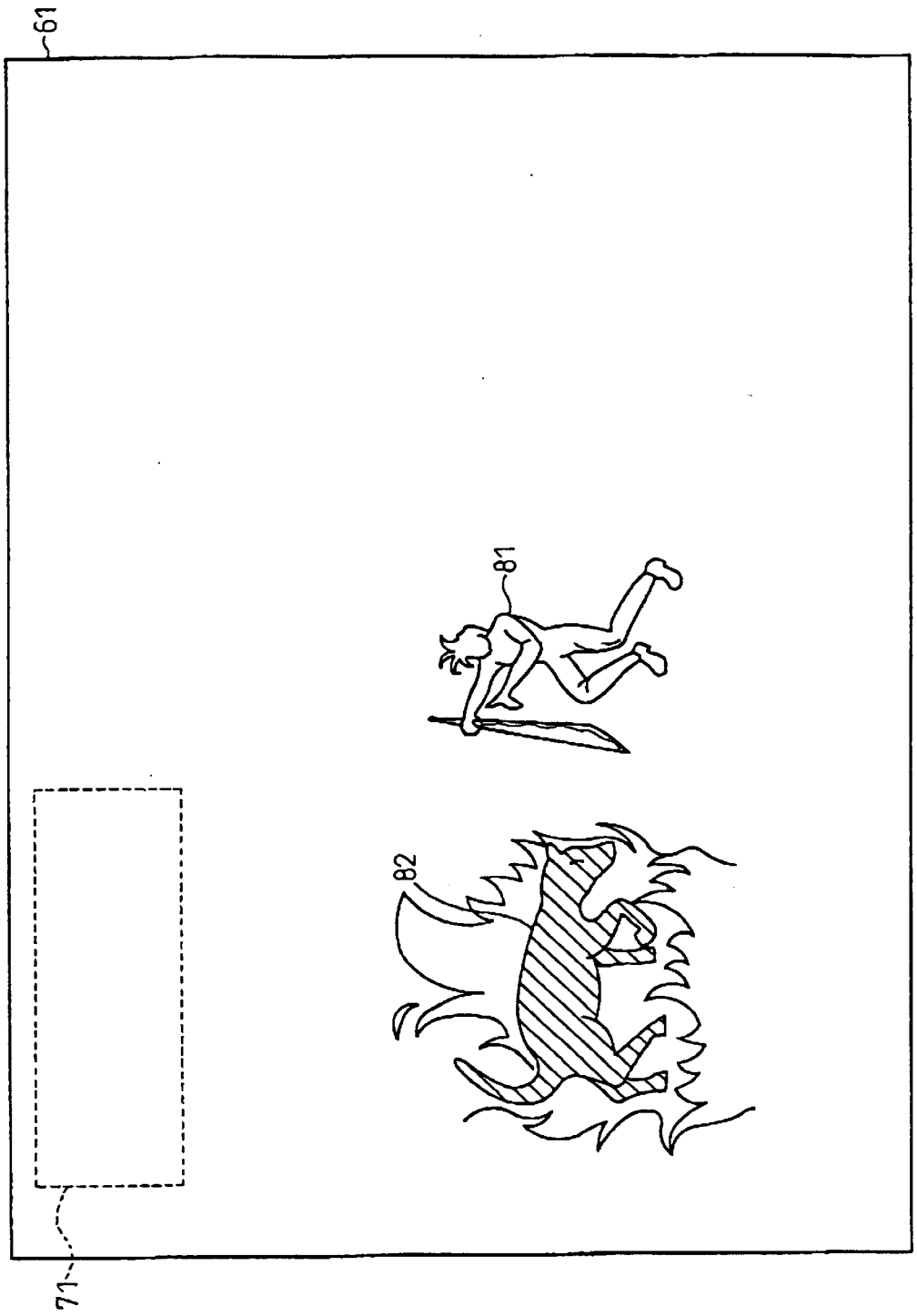
FIG. 12 is a view of an example of the screen display shown in waiting time processing of the first embodiment of the present invention.

The sub window 67 is displayed until any item is selected. When any action in the sub window 67 is selected (step S6), the waiting time table 20 is referred to. Further, the setting data of the waiting time corresponding to the selected action is acquired. Based on the setting data of the waiting time, as shown in FIG. 11, the display screen 61 displays the guidance window 76.

The guidance window 76 displays the value of the magic points (MP) consumed when executing the selected action and the value of the waiting time (WT) generated by execution of the action (step S7). The player can judge if an action has been executed or another action has been changed to by viewing the consumption value of the magic points and the value of the waiting time.

When the player desires to determine the selected action for execution (step S8), the routine returns to step S5 where the actions which the player character can execute are displayed listed up. On the other hand, when a selected action is determined for execution, the input of a command for setting an action for the player character is set as invalid (step S9). That is, the controller 11 enters a state where it cannot receive a command input for setting an action. Alternatively, the controller 11 enters a state where it can receive a command input, but this is not treated as a valid command input.

Next, the guidance display 72 of "WAITING FOR COMMAND" displayed in the waiting time information display area 71 and the guidance window 76 displaying the consumption value of the magic points and the value of occurrence of the waiting time are erased from display screen 61 (step S10). Next the waiting time table 20 is referred to and the setting data of the waiting time corresponding to the determined action is acquired (step S11). In this way, when not counting the waiting time, the initial Action can be immediately set.

Next, the processing corresponding to the determined action is executed (step S12). This includes for example the graphic display control of the player character corresponding to the determined action, the sound output control, the calculation of various parameters accompanying the execution of actions, and other processing. For example, in the example of the screen display shown in FIG. 12, the player character 81 is displayed in the pose executing an attack. The enemy character 82 is displayed receiving damage. Further, for example, an explosion or other sound effect is output.

When the processing in accordance with the action is executed, it is judged that if set waiting time corresponding to the executed action is not zero (step S13). When the set waiting time is zero, the routine proceeds to step S1. That is, the input of a command is set as valid to receive the input of an instruction for the next action of the player character. In the present embodiment, the action with a set waiting time set to zero is for example an action relating to movement such as "WALK", "RUN", and "JUMP". On the other hand, when the set waiting time is not zero, the waiting time table 20 is referred to. The set waiting time data corresponding to the executed action is obtained. The later explained waiting time gauge is displayed based on the acquired data (step S14).

Figure 13:
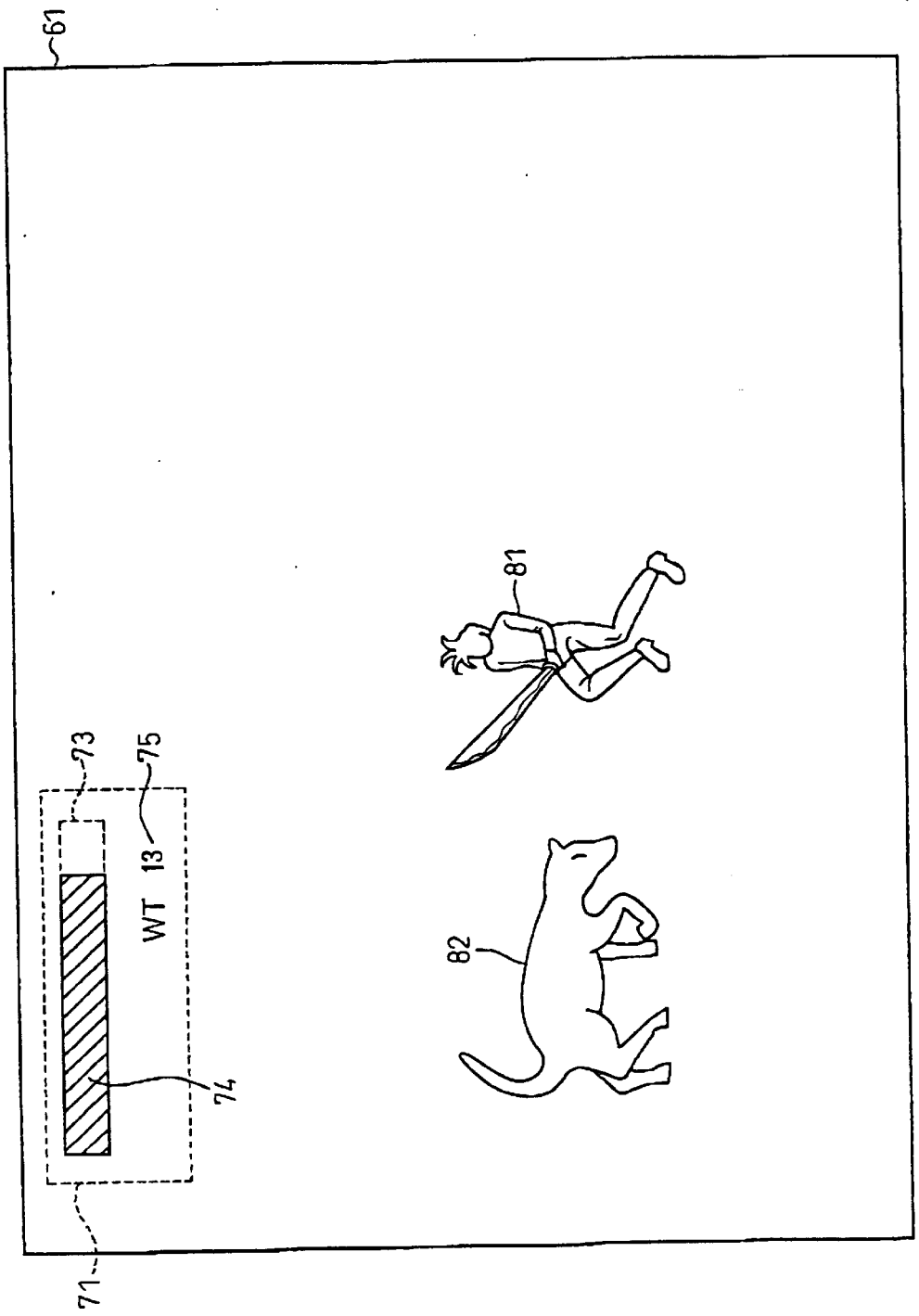
FIG. 13 is a view of an example of the screen display shown in waiting time processing of the first embodiment of the present invention.

For example, as shown by the example of the display screen shown in FIG. 13, the waiting time gauge 73 is displayed in the waiting time information display area 71. In the waiting time gauge 73, a waiting time bar 74 changing in length in accordance with the remaining time of the waiting time is displayed. Further, the numerical information 75 showing the remaining time of the waiting time (in the example illustrated, "WT 13") is displayed in the waiting time information display area 71. Note that the waiting time bar 74 shown in FIG. 13 and the numerical information 75 showing the remaining time show the state where exactly the count time of "2" elapses and the remaining waiting time is "13" for an action with a set waiting time of "15" (magic "FIREBALL" etc., see FIG. 3). When the waiting time gauge 73 is displayed at step S14, since the counting of the waiting time has started, the waiting time bar 74 extends over the entire length of the waiting time gauge 73. Further, the numerical information 75 is "WT 15" in the case of the magic "FIREBALL".

Next, the count control table 21 is referred to and the count speed with the flag of the "COUNT SPEED" column 212 of "1" is confirmed (step S15). Further, the value of the "COUNT TIME" column 211 of the count control table 21 is reset to zero (step S16) and the count is started by the count speed confirmed at step S15 (step S17). Next, the subroutine for the count speed change processing is executed (step S18). The count speed change processing will be explained later.

In the count speed change processing of step S18, when the count speed is changed, the flag corresponding to the new count speed is set to "1" in the "COUNT SPEED" column 212 of the count control table 21. The other flags are set to "0". Therefore, after the count speed change processing, the "COUNT SPEED" column 212 of the count control table 21 is referred to and the count speed is again confirmed. Next, the count value for the waiting time is updated by this count speed (step S19). Further, the display of the waiting time bar 74 of the waiting time gauge 73 and the numerical information 75 showing the remaining time is updated (step S20). FIG. 13 shows an example of the screen display at that time. Note that the updating of the display of the waiting time gauge 73 and the numerical information 75 of the remaining time will be explained later.

Until the counted waiting time reaches the set waiting time, the series of processing from the count speed change processing of step S18 to the updating of the display of the waiting time gauge 73 and numerical information 75 of the remaining time of step S20 is repeated (step S21). When the counted waiting time reaches the set waiting time at step S21, the value of the "COUNT TIME" column 211 of the count control table 21 is reset to zero (step S22). Next, the routine returns to step S1 where an input of an instruction of the next action of the player character is received and therefore the input of a command is set as value. This processing is then similarly repeated. This waiting time processing ends when an interruption occurs for executing other processing, when no instruction for action has been input for more than a predetermined time, etc.

Figure 9:
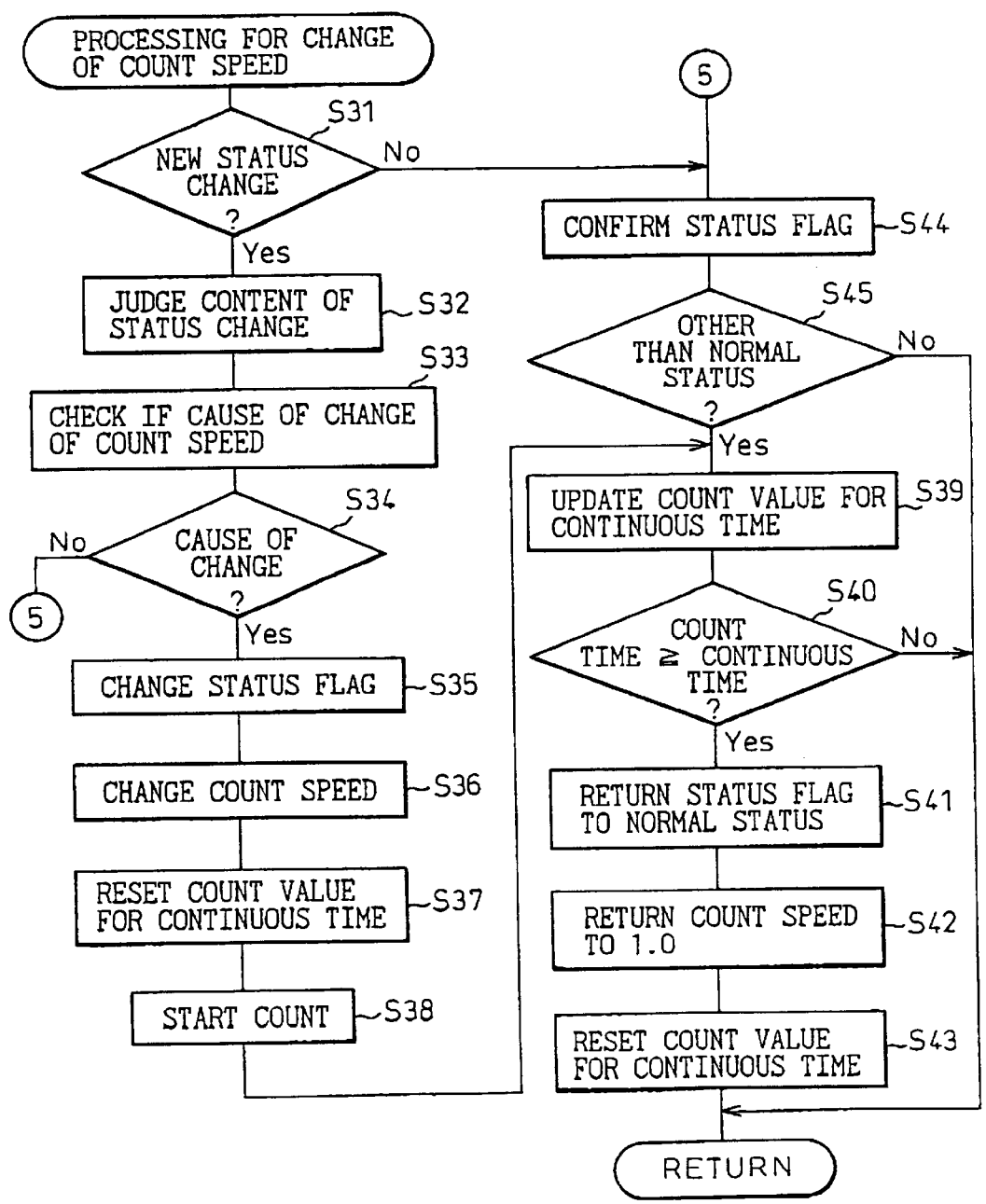
FIG. 9 is a flow chart of the count speed change processing of the first embodiment of the present invention.

FIG. 9 is a flow chart of the count speed changing processing.

The count speed changing processing will be explained next with reference to FIG. 9.

The count speed changing processing is executed alone by interruption when a change occurs in the state of the player character in addition to the case of execution as a subroutine of the waiting time processing.

When the count speed changing processing is started, first, it is judged if a new change of state has occurred in the player character (step S31). When a new change of state has occurred (corresponding to case of execution of the processing by interruption), it is judged what kind of change that change in state is (step S32). Further, the "STATUS" column 221 of the count speed change control table 22 is referred to and it is judged if the content of the change of state judged at step S32 is a factor of change of the count speed (step S33). When the result is that it is a factor of change of the count speed (step S34), the value of the status flag corresponding to that factor of change is set to "1". The values of the other flags are set to "0" (step S35). When a plurality of status flags can be set to "1", one of these status flags is set to "1" based on a predetermined priority.

Next, in the "COUNT SPEED" column 212 of the count control table 21, at step S35, the flag corresponding to a count speed with a value of the status flag of the count speed change control table 22 set to "1" is set to "1". The other flags are set to "0" (step S36). Further, the count value of the "CONTINUOUS TIME" column 224 of the count speed change control table 22 is reset to "0" (step S37) and the counting of the continuous tie is started (step S38). At this time, the count value of the continuous time is not particularly limited, but for example is incremented by one every one-quarter of a second (15 frames). The counting of the continuous time is performed at a predetermined speed of 1.0 provided in a fixed manner without regard as to the change of state of the player character.

Along with the progress of the counting, the count value of the "CONTINUOUS TIME" column 224 of the count speed change control table 22 is continuously updated (step S39). When the updated count value reaches the preset value of the continuous time (step S40), the flag corresponding to the "NORMAL CASE" in the count speed change control table 22 is set to "1" and the other flags is set to "0" (step S41). Further, in the "COUNT SPEED" column 212 of the count control table 21, the flag corresponding to a count speed of "1.0" is set to "1". The other flags are set to "0" (step S42). Due to this, the count speed is returned to "1.0".

Next, the count value of the "CONTINUOUS TIME" column 224 of the count speed change control table 22 is reset to "0" (step S43), then the count speed change processing ends. Further, when the count value of the continuous time counted has not reached the predetermined value at step S40, that is, when the counting of the continuous time has not ended, the count speed change processing ends.

Further, when no new change in state has occurred in a player character at step S31 (corresponding to the case where the processing is executed as a subroutine of the waiting time processing) or when the content of the change of state occurring in the player character does not correspond to a factor of change of the count speed at step S34, the "STATUS FLAG" column 223 of the count speed change control table 22 (step S44) is referred to and it is judged if the flag corresponding to a state other than a "NORMAL CASE" is "1". If the flag corresponding to the state other than a "NORMAL CASE" is "1", the routine proceeds to step S39 for counting the continuous time in that state and the subsequent processing is performed. On the other hand, if the flag corresponding to the "NORMAL CASE" is "1", it is not necessary to count the continuous time, so the count speed change processing is ended.

Next, an explanation will be given of the format of display of the waiting time gauge 73 and the numerical information 75 showing the remaining time of the waiting time.

FIGS. 14A, 14B, 14C, and 14D are views of an example of transition of the display of the waiting time gauge 73 and the numerical information 75 showing the remaining time of the waiting time.

The entire length of the waiting time gauge 73 corresponds to the value of the "WAITING TIME" column 201 corresponding to the executed action. The waiting time bar 74 provided in the gauge 73 expresses the remaining time of the waiting time and for example is reduced along with the value of the numerical information 75 showing the remaining time.

Figure 14A:
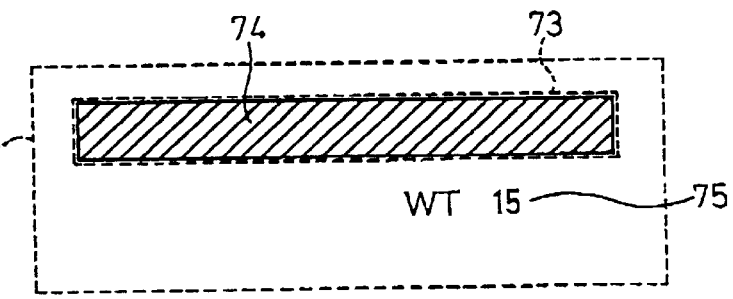
FIGS. 14A, 14B, 14C, and 14D are views of an example of the transition in a waiting time gauge etc. displayed on a screen by the waiting time processing of the first embodiment of the present invention.
Figure 14B:
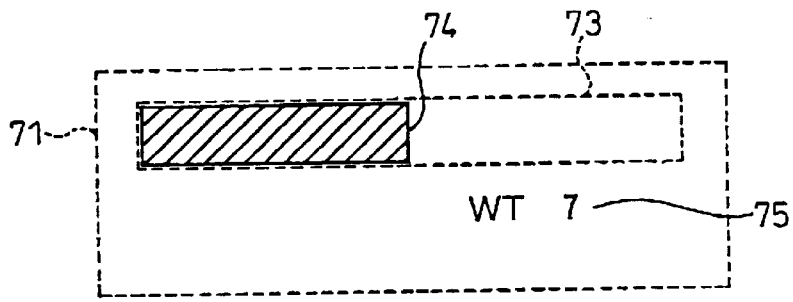
Figure 14C:
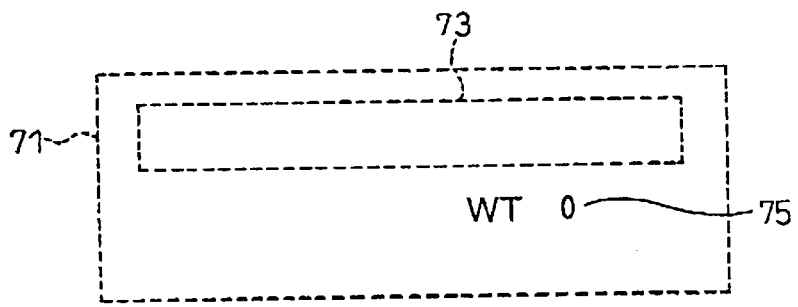
Figure 14D:

That is, the waiting time bar 74 (hatching area) is displayed, as shown in the order of FIG. 14A and FIG. 14B, so as to be gradually reduced from the right end of the waiting time gauge 73 toward the left end along with the increase of the time counted. When the counted time becomes the preset value of the waiting time, as shown in FIG. 14C, the waiting time bar 74 disappears. When the input of a command for setting an action for the player character is set as valid (step S1), the guidance display 72 of a message "WAITING FOR COMMAND" is displayed as shown in FIG. 14D to prompt the input of a command from the player. When a waiting time occurs due to the next action executed by the input of a command, the routine returns to the display shown in FIG. 14A and then a similar display is repeated. The numerical information 75 showing the remaining time of the waiting time becomes the numerical value corresponding to the action executed at that time.

Using the information shown by the waiting time gauge 73, the waiting time bar 74, and the numerical information 75 showing the remaining time of the waiting time, the player can discern at a glance how much time needs to elapse before it can instruct the next action for the player character 81.

According to the first embodiment, the amount of waiting time up to when the input of a command for setting the next action for the player character 8 can be set in accordance with the content of the previous action of the player character 81. Therefore, for example, it becomes possible to set the waiting time in accordance with the content of the attack such as an intermediate time for the waiting time when instituting a normal attack, a large time for the waiting time when instituting a killer skill attack more powerful than a normal attack, and a small time for the waiting time when using an item with a small effect. Due to this, the effect of enhancing the play effect of the game is obtained in a scene relating to execution of an action of a character based on the operation.

Further, according to the first embodiment, when setting the fighting action of the player character 81, the player can be made to set a current action (attack, defense, use of item, etc.) considering the waiting time until setting of the next action becomes possible, so the strategic elements of the fighting scene can be enhanced.

Further, according to the first embodiment, the count speed of the waiting time is changed in accordance with the current state of the player character 81, for example, poisoning, rashes, or other status abnormalities, the state of specific magic being cast, etc. Therefore, it is possible to change the amount of waiting time in accordance with the state of the player character 81, so it is possible to change the substantive amount of waiting time giving due consideration to the current state of the player character 81.

Further, according to the first embodiment, the programs for the waiting time processing and the count speed change processing are stored in the program product 4, that is, the CD-ROM. Therefore, using the program product 4, it becomes possible to easily distribute and sell the program as a software product independent from the game console 2. Further, by using a computer or other hardware for using this software, it is possible to easily execute the game of the first embodiment by the hardware.

Figure 19:
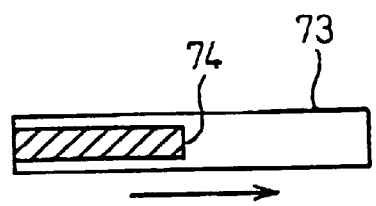
FIG. 19 is a schematic view of another example of display of the waiting time gauge.

Note that in the first embodiment, the waiting time bar 74 was reduced along with the progress in counting in the waiting time gauge 73, but the invention is not limited to this. As shown in FIG. 19, the waiting time bar 74 is increased along with the progress of the counting. It is also possible to configure it so that when it extends over the entire length of the waiting time gauge 73, the instruction for setting the next action may be input.

Figure 20:
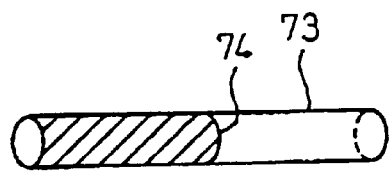
FIG. 20 is a schematic view of another example of display of the waiting time gauge.
Figure 21:
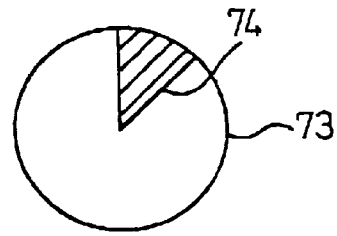
FIG. 21 is a schematic view of another example of display of the waiting time gauge.

Further, the display modes of the waiting time gauge 73 and the waiting time bar 74 are not limited to the first embodiment. For example, they may also be made three-dimensional displays as shown in FIG. 20 or pie graph displays as shown in FIG. 21.

Further, in the first embodiment, the waiting time for the player character was controlled, but the present invention is not limited to this. It is also possible to control the waiting time in the same way for the enemy character.

Second Embodiment

Next, a second embodiment of the present invention will be explained. The second embodiment is different from the first embodiment in the point that control is performed so as to enable the player character to be made to execute a predefined specific action even while counting the waiting time in the waiting time processing. Therefore, the setting means of the game system 1 can receive an operational input for instructing a specific action as valid even during the period when the input of an instruction for a next action to a player characteristics is set as invalid.

Further, the game system 1 is further provided with a detecting means for detecting an operational input for instructing a specific action and an action executing means for executing processing relating to an action of a character corresponding to an operational input detected by the detecting means. The controller 11 has the functions of the detecting means and the action executing means. The sound processor 14 and the graphic processor 15 have the function of the action executing means. Further, for realizing the above control, the later-explained action judgement processing is executed by interruption every predetermined period while counting the waiting time.

Figure 15:
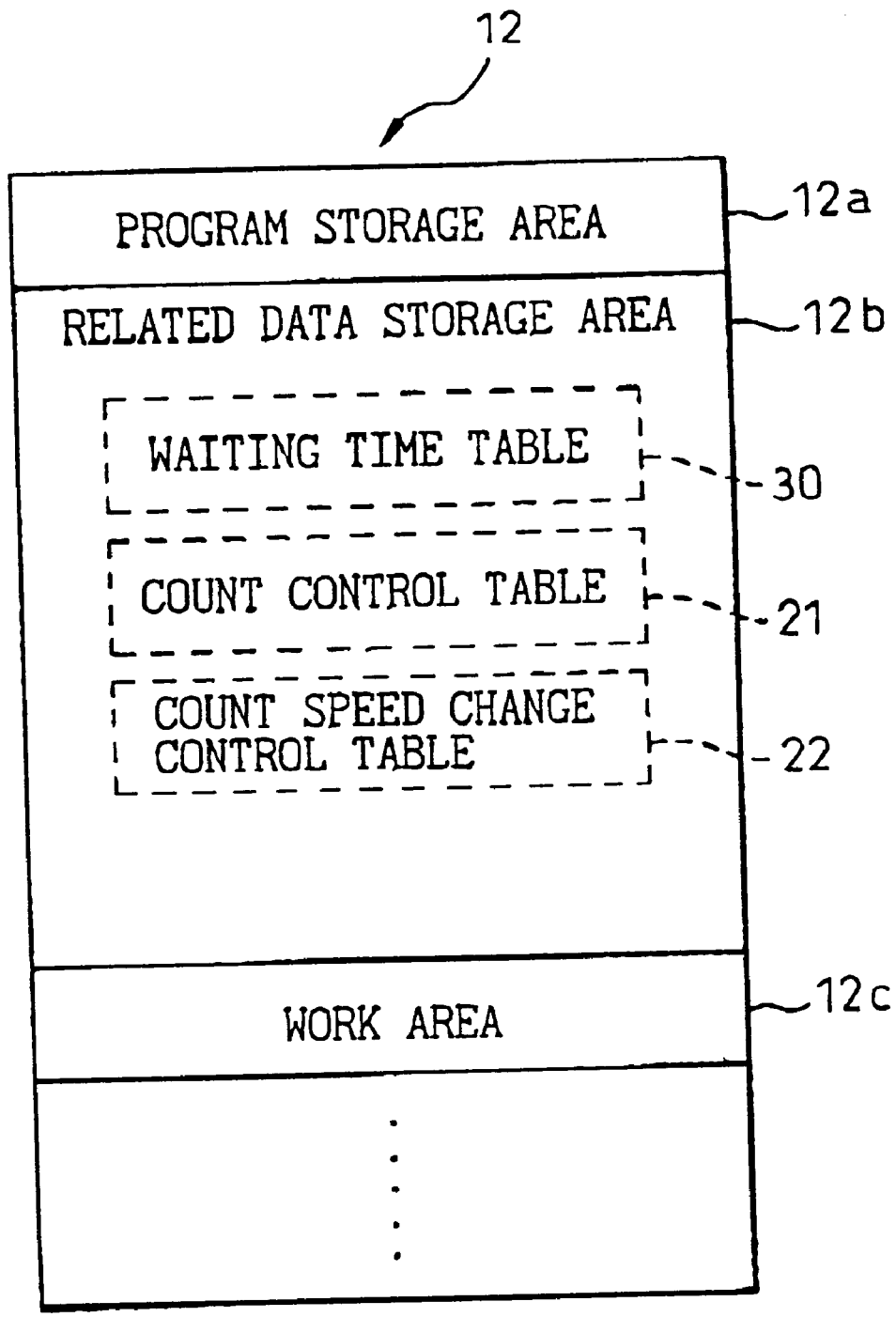
FIG. 15 is a view of the memory configuration of the RAM in a second embodiment of the present invention.

To define such a specific action, in the second embodiment, for example, the memory configuration of the RAM 12 differs from the first embodiment. FIG. 15 is a view of the memory configuration of the RAM 12 in the second embodiment. As shown in FIG. 15, the related data storage area 12b of the RAM 12 stores a waiting time table 30 different in configuration from the waiting time table 20 of the first embodiment.

The rest of the configuration and functions are the same as in the first embodiment. Further, the hardware configuration of the game system 1, the count control table 21, and the count speed change control table 22 are also the same as in the first embodiment. Further, the waiting time processing and count speed change processing are the same as in the first embodiment. Parts of the configuration the same as the first embodiment are assigned the same reference numerals as in the first embodiment and overlapping explanations are omitted. Below, only points different from the first embodiment will be explained.

Figure 16:
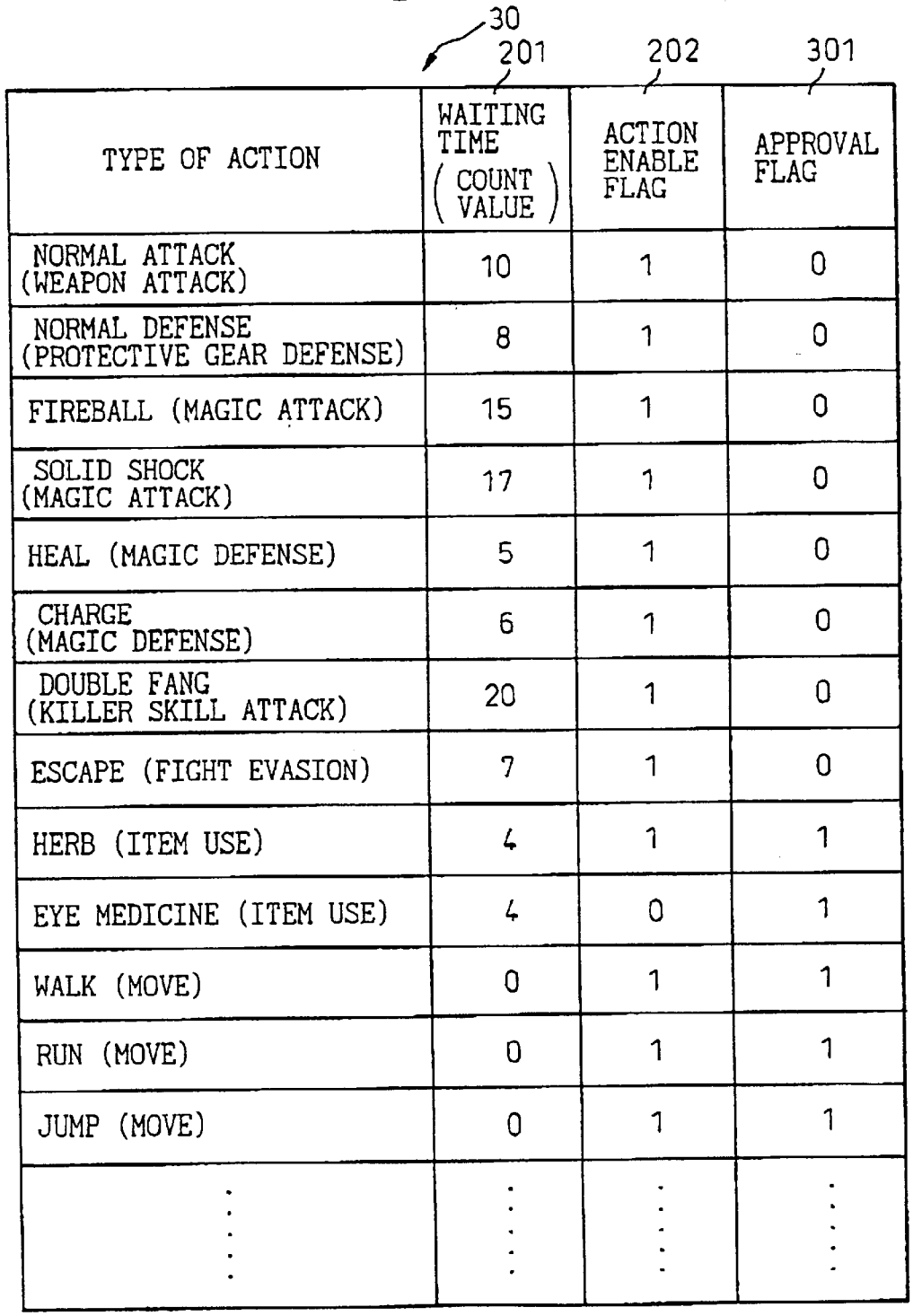
FIG. 16 is a view of the data structure of a waiting time table stored in the RAM shown in FIG. 15.

FIG. 16 is a view of the data configuration of the waiting time table 30.

The waiting time table 30 is a table storing the correspondence between all actions which a player character can execute and the waiting time. The waiting time table 30 is for example comprised of a "WAITING TIME" column 201, "ACTION ENABLE FLAG" column 202, and "APPROVAL FLAG" column 301.

The "APPROVAL FLAG" column 301 stores the value of "1" or "0". An action with a value of the approval flag of "1" is a specific action which a player character can be made to execute even while counting the waiting time. An action with a value of the approval flag of "0" is an action which can be executed only in the period when the input of a command for setting an action is set as valid. In the example shown in FIG. 16, for example, an action of use of an item such as a "HERB" or "EYE MEDICINE" and an action of movement such as "WALK", "RUN", and "JUMP", may be executed even while counting the waiting time. The "WAITING TIME" column 21 and "ACTION ENABLE flag" column 202 are the same as in the first embodiment, so the explanations thereof will be omitted.

Next, the operation of the game system 1 according to the present embodiment will be explained in detail.

The controller 11, at the time of startup, reads the program and data required for execution of the game from the program product 4, that is, the CD-ROM, through the CD-ROM drive and transfers them to the RAM 12 based on the operating system stored in the built-in ROM. The controller 11 executes the program transferred to the RAM 12 to realize various types of processing described below. Note that some of the control operations performed by the game system 1 are actually performed by circuits other than the controller 11 in cooperation with the controller 11. For convenience of explanation, the explanation below will be given assuming that control involving the controller 11 is performed directly by the controller 11.

Further, the program and data required for executing the game are successively read from the program product 4, that is, the CD-ROM, and transferred to the RAM 12 in accordance with the state of progress of processing in accordance with the commands from the controller 11. In the following explanation, however, to facilitate the understanding of the invention, a detailed description of the reading of data from the CD-ROM and transfer to the RAM 12 is omitted.

Figure 17:
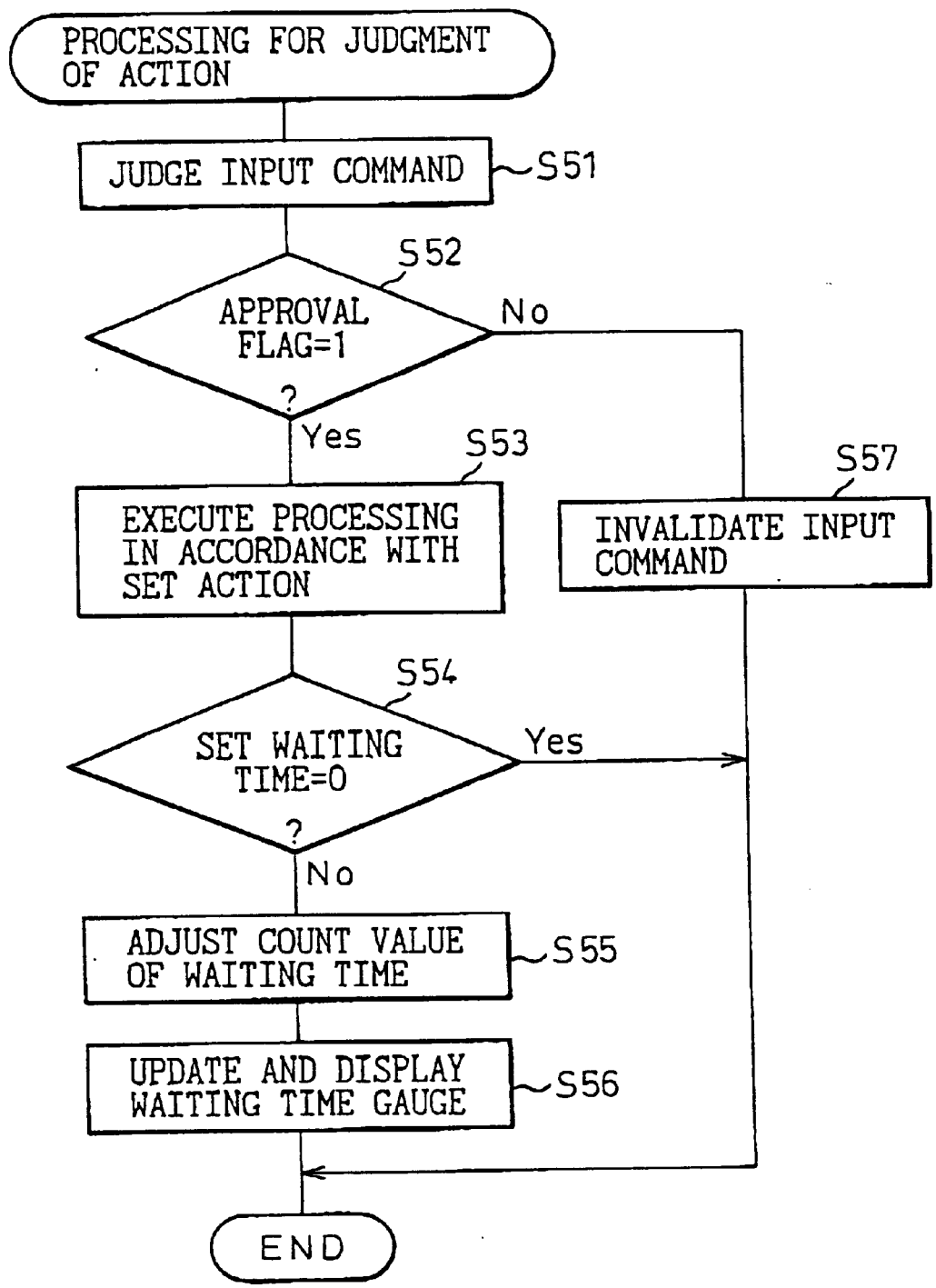
FIG. 17 is a flow chart of action judgement processing of the second embodiment of the present invention.

FIG. 17 is a flow chart of the action judgement processing.

An explanation will be given of the action judgement processing while referring to FIG. 17.

When the action judgement program is executed by interruption every predetermined period while counting the waiting time, first, the action is judged based on the input command (step S51). It is judged if the value of the approval flag of the judged action is "1" or not with reference to the waiting time table 30 (step S52). If the value of the approval flag is "1", the processing corresponding to the action is executed based on the input command (step S53). This includes for example the graphic display control, sound output control, calculation of parameters accompanying execution of actions, and other processing in accordance with the designated action.

Next, it is judged referring to the waiting time table 30 if a waiting time other than zero has been set for the action executed (step S54). When the set waiting time is not zero, the setting of the waiting time is added to the value of the waiting time being counted. That is, by executing a specific action at step S53, the waiting time is prolonged. Specifically, the value of the set waiting time linked with an action executed at step S54 is subtracted from the value being counted up stored in the "COUNT TIME" column 211 of the count control table 21 (step S55).

Further, in accordance with the adjustment of the count value of the waiting time, the display of the waiting time gauge 73 displayed on the display screen 61, the waiting time bar 74, and the numerical information 75 showing the remaining time of the waiting time is updated (step S56).

Figure 18A:
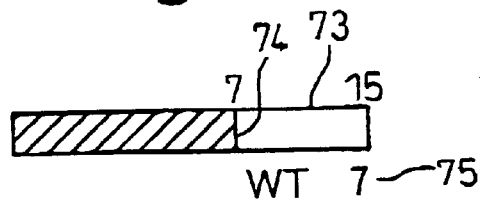
FIGS. 18A and 18b are schematic views of the state of change of the display of a waiting time gauge etc. by the action judgement processing of the second embodiment of the present invention.
Figure 18B:
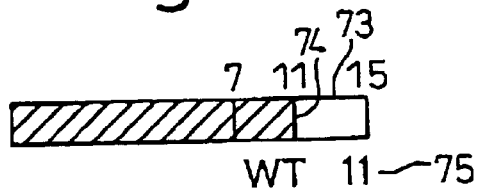

FIGS. 18A and 18B are schematic views of examples of the updating of the display when using an item "HERB" when the remaining time of the waiting time set at for example "15" becomes "7". In this way, due to use of the "HERB", the numerical information 75 showing the remaining time of the waiting time increases to "11" and the waiting time bar 74 increases correspondingly.

When the display of the waiting time gauge 73 etc. finishes being updated, the action judgement processing ends. Further, at step 52, if the value of the approval flag corresponding to the action based on the input command is "0", the input command is made invalid and the action judgement processing is ended.

According to the second embodiment, it is possible to make the player character execute a specific action even while counting the waiting time, so the pattern of action of the player character is diversified and the tactical nature and interestingness:are enhanced more.

Further, according to the second embodiment, the program of the processing for judgement of action is stored in the program product 4, that is, the CD-ROM. Therefore, using the program product 4, it becomes possible to easily distribute and sell the program as a software product independent from the game console 2. Further, by using a computer or other hardware for using this software, it is possible to easily execute the game of the second embodiment by the hardware.

Note that in the second embodiment, the actions which can be executed while counting the waiting time were mentioned as the action of use of an item such as a "HERB" or "EYE MEDICINE" and the action of movement of "WALK", "RUN", or "JUMP", but the invention is not limited to this. It is also possible to set other actions as actions which can be executed while counting the waiting time.

Further, the present invention is not limited to the second embodiment. It is also possible to configure it to accept only instructions for movement when an instruction for movement of the player character is entered by the direction keys of the input device 3 while counting the waiting time. In this case, it is sufficient to make only operational signals input from direction keys, the pause key, and other keys relating to movement valid.

The present invention was explained above in detail based on various embodiments, but the present invention is not limited to these embodiments. It may also be suitably changed within the range outside its gist.

For example, in the above embodiments, the explanation was made of the case of realization of the present invention using a home game system as a platform, but the present invention may also be realized using a personal computer or other general computer or arcade game machine as a platform. It may also be realized using a cellular phone, portable data terminal, car navigation system, or other communications terminal as a platform.

In the above embodiments, the program or data for realizing the present invention was stored in a CD-ROM and the CD-ROM was used as the recording medium. The recording medium, however, is not limited to a CD-ROM and may also be another computer readable magnetic or optical recording medium or semiconductor memory.

Further, the program or data for realizing the present invention is not limited to a form provided by a recording medium such as a CD-ROM loadable in a game system or computer. That is, the program or data for realizing the program may also be of a form downloaded by the communications interface 17 shown in FIG. 1 from another piece of equipment on the network connected through the communications line 99. Further, the above program or data may be stored in the memory of another piece of equipment on the network 100 connected through the communications line 99 and successively stored in the RAM 12 in accordance with need through the communications line 99.

Summarizing the effects of the invention, according to the present invention, it is possible to set the amount of a waiting time of a command input until the next action can be set in accordance with the content of the previous action of a character. Further, since the count speed of the waiting time is changed in accordance with the state of the character, the actual amount of the waiting time can be changed considering the current state of the character.

While the invention has been described by reference to specific embodiments chosen for purposes of illustration, it should be apparent that numerous modifications could be made thereto by those skilled in the art without departing from the basic concept and scope of the invention.

What is claimed:

1. A computer readable program product storing a program for controlling progress of a game, said program product storing a program for making a computer:

set as invalid an operational input for instructing a next action of a character when an action of said character has already been instructed, start a count based on a predetermined timing from when the operational input has been set as invalid to when said action of said character has ended, change a count speed to a count speed linked with a changed state of the character when a state of the character is changed to any state of a plurality of predefined states after the start of the counting, set as valid an operational input for instructing a next action of the character when said counted time reaches a predetermined time set linked in advance with said action, and executing processing relating to action of the character instructed in accordance with the operational input after said operational input has been set as valid.

2. A program product as set forth in claim 1, wherein said program further makes said computer:

set as invalid an operational input for instructing a next action of a character other than a predefined specific action when setting as invalid an operational input, detect an operational input for instructing said specific action when said counted time reaches a predetermined time set linked with said action, and execute processing related to an action of the character corresponding to the detected operational input.

3. A program product as set forth in claim 1, where said program further makes said computer display a remaining time until a period ends in a period where said operational input for instructing a next action of a character is set as invalid after the start of said count.

4. A program product as set forth in claim 1, wherein said program further makes said computer display guidance for prompting a player to enter an operational input for instructing a next action of a character after an operational input is set as valid.

5. A program product as set forth in claim 1, wherein said program further makes said computer display guidance on a period for setting as invalid an operational input set linked with an action able to be instructed when an action of a character is to be instructed in accordance with an operational input.

6. A program for controlling progress of a game, said program making said computer:

set as invalid an operational input for instructing a next action of a character when an action of said character has already been instructed, start a count based on a predetermined timing from when an the operational input has been set as invalid to when said action of said character has ended, change a count speed to a count speed linked with a changed state of the character when a state of the character is changed to one of a plurality of predefined states after the start of the counting, set as valid an operational input for instructing a next action of a character when said counted time reaches a predetermined time set linked in advance with said action, and execute processing relating to action of the character instructed in accordance with the operational input after said operational input has been set as valid.

7. A program as set forth in claim 6, further making said computer:

set as invalid an operational input for instructing a next action of a character other than a predefined specific action when setting as invalid an operational input, detect an operational input for instructing said specific action when said counted time reaches a predetermined time set linked with said action, and execute processing related to an action of the character corresponding to the detected operational input.

8. A program as set forth in claim 6, further making said computer display the remaining time until a period ends in a period where said operational input for instructing a next action of a character is set as invalid after the start of said count.

9. A program as set forth in claim 6, further making said computer display guidance for prompting a player to enter an operational input for instructing a next action of a character after an operational input is set as valid.

10. A program as set forth in claim 6, further making computer display guidance on a period for setting as invalid an operational input set linked with an action able to be instructed when an action of a character is to be instructed in accordance with an operational input.

11. A game control method for controlling program of a game, said game control method including:

setting as invalid an operational input for instructing a next action of a character when an action of said character has already been instructed, starting a count based on a predetermined timing from when the operational input has been set as invalid to when said action of said character has ended, changing a count speed to a count speed linked with a changed state of the character when a state of the character is changed to one of a plurality of predefined states after the start of the counting, setting as valid an operational input for instructing a next action of the character when said counted time reaches a predetermined time set linked in advance with said action, and executing processing relating to action of the character instructed in accordance with the operational input after said operational input has been set as valid.

12. A game control method as set forth in claim 11, further including:

setting as invalid an operational input for instructing a next action of a character other than a predefined specific action when setting as invalid an operational input, detecting an operational input for instructing said specific action when said counted time reaches a predetermined time set linked with said action, and executing processing related to an action of the character corresponding to the detected operational input.

13. A game control method as set forth in claim 11, further including displaying the remaining time until a period ends in a period where said operational input for instructing a next action of a character is set as invalid after the start of said count.

14. A game control method as set forth in claim 11, further including displaying guidance for prompting a player to enter an operational input for instructing a next action of a character after an operational input is set as valid.

15. A game control method as set forth in claim 11, further including displaying guidance on a period for setting as invalid an operational input set linked with an action able to be instructed when an action of a character is to be instructed in accordance with an operational input.

16. A game processor provided with:

a computer readable program product storing a program for controlling progress of a game and a computer for reading and executing at least part of said program from said program product, said computer:

reading at least part of said program from said program product and thereby setting as invalid an operational input for instructing a next action of a character when an action of said character has already been instructed, starting a count based on a predetermined timing from when the operational input has been set as invalid to when said action of said character has ended, changing a count speed to a count speed linked with a changed state of the character when a state of the character is changed to one of a plurality of predefined states after the start of the counting, setting as valid an operational input for instructing a next action of a the character when said counted time reaches a predetermined time set linked in advance with said action, and executing processing relating to action of the character instructed in accordance with the operational input after said operational input has been set as valid.

17. A game processor as set forth in claim 16, wherein said computer further:

sets as invalid an operational input for instructing a next action of a character other than a predefined specific action when setting as invalid an operational input, detects an operational input for instructing said specific action when said counted time reaches a predetermined time set linked with said action, and executes processing related to an action of the character corresponding to the detected operational input.

18. A game processor as set forth in claim 16, wherein said computer further displays the remaining time until a period ends in a period where said operational input for instructing a next action of a character is set as invalid after the start of said count.

19. A game processor as set forth in claim 16, wherein said computer further displays guidance for prompting a player to enter an operational input for instructing a next action of a character after an operational input is set as valid.

20. A game processor as set forth in claim 16, wherein said computer further displays guidance on a period for setting as invalid an operational input set linked with an action able to be instructed when an action of a character is to be instructed in accordance with an operational input.

* * * * *

UNITED STATES PATENT AND TRADEMARK OFFICE
CERTIFICATE OF CORRECTION

PATENT NO. : 6,729,960 B1
DATED : May 4, 2004
INVENTOR(S) : Y. Matsuno

It is certified that error appears in the above-identified patent and that said Letters Patent is hereby corrected as shown below:

Column 18,
Line 7, before "the" delete "an".
Line 43, after "controlling" insert -- a --.

Column 20,
Line 4, after "of" delete "a".

Signed and Sealed this

Twenty-second Day of March, 2005

JON W. DUDAS
*Director of the United States Patent and Trademark Office*